Patented June 9, 1936

2,043,667

UNITED STATES PATENT OFFICE 2,043,667

SOAKING OF HIDES

Richard Klein, Heinrich Ulrich, and Paul Koerding, Ludwigshafen-on-the-Rhine, Germany, assignors to I. G. Farbenindustrie Aktiengesellschaft, Frankfort-on-the-Main, Germany No Drawing. Application January 29, 1935, Serial No. 3,942. In Germany February 7, 1934

7 Claims. (Cl. 149—2)

The present invention relates to a new process for soaking hides and preparations suitable for carrying out the said process.

This invention is an improvement of the invention described in the U. S. Patent No. 1,870,179 for a process for soaking dry hides by means of aqueous solutions of alkylol amines.

We have now found that the effect of the soaking baths can be considerably improved by employing, instead of the alkylol amines themselves reaction products of alkylolamines with sulphurous acid, i. e. products obtainable by reacting the alkylol amines with sulphur dioxide or free sulphurous acid or sulphites. While it may be assumed that these reaction products are salts, it might be that another reaction than a mere salt-formation goes on between the alkylolamine and sulphurous acid employed in any form. The present invention shall not be restricted by any such theory but includes the use of reaction products of the said components broadly. The said products are obtained for example by leading sulphur dioxide into aqueous solutions of hydroxyalkylamines of the kind specified in the said U. S. Patent No. 1,870,179, such as monoethanolamine, triethanolamine, methylbutanolamine, cyclohexylethanolamine, diethylbutanolamine and hydroxyethylmethylaniline, or by causing aqueous solutions of the said hydroxyalkylamines to react with aqueous solutions of salts of sulphurous acid, as for example sodium or ammonium sulphite. Generally speaking ordinary temperature is employed, but elevated temperature may also be applied.

The amounts of sulphurous acid or its salts to be employed depend on the nature of the hydroxylalkylamines employed; for example amounts of 0.25 molecular proportion or less of sulphurous acid for each molecular proportion of hydroxyalkylamine are sufficient to produce the improved soaking power characteristic for the additions to be made according to the present invention. Higher proportions of sulphurous acid may also be employed but they should be so selected that the reaction of the product is alkaline. It is advantageous, to stop the soaking treatment before the hides considerably swell. Usually from 0.5 to 5 parts per thousand of the special products are added, calculated on the bath; the invention is, however, not restricted to such amounts. The following examples will further illustrate the nature of this invention but the invention is not restricted to these examples.

Example 1

9 kilograms of sulphur dioxide are led at room temperature into a solution of 60 kilograms of monoethanolamine in 120 liters of water.

Dry hides are treated in a solution obtained by adding 1 gram of the solution prepared as above to each liter of water. Soaking commences very rapidly; the swelling optimum amounts to about 127 per cent.

If hard water is employed, it is advantageous to add some calcined sodium carbonate thereto before the soaking.

Example 2

15.75 kilograms of sodium sulphite are added at room temperature while stirring to a solution of 89 kilograms of monobutanolamine in twice the amount of water. 1 gram of the said solution is added to each liter of a soaking liquid for Java kips. The soaking of the hides takes place in a considerably shorter time than when employing monobutanolamine alone without the nature of the soaked hide being injuriously affected.

If instead of monobutanolamine butyldiethanol amine is employed, a similar effect is obtained.

Example 3

26 kilos of sodium bisulphite are introduced while stirring at room temperature into a solution of 103 kilograms of methylbutanolamine in 100 liters of water.

If heavy Rio-Grande hides be soaked in a bath containing from 1 to 2 grams of the resulting solution per liter of liquid, a considerably more rapid softening is obtained than when employing methylbutanolamine alone; the nature of the treated goods is very good.

The process according to the present invention as compared with that of United States Patent 1,870,179 offers the advantage that the same soaking effect is obtained much more rapidly if similar amounts of additional substances are employed, or in about the same time with considerably lower amounts of the soaking additions. If for example dry hides are soaked in a bath while using a product obtainable by leading 9 parts by weight of sulphur dioxide into a solution of 60 parts by weight of monoethanolamine in 120 parts of water, a rapid and thorough soaking of the hides is attained. If instead of the said product merely an aqueous solution of monoethanolamine is employed double the amount of the latter compound is necessary for attaining the same effect.

If dry Java kips are soaked in a bath containing per liter 1 gram of a product obtainable by reacting 89 parts by weight of monobutanolamine (dissolved in 178 parts by weight of water) with 15.75 parts by weight of sodium sulphite the optimum soaking effect is attained after about 48 hours. If the same amount of monobutanolamine (not reacted with sodium sulphite) is employed the same soaking effect is attained after about 72 hours only.

Heavy Rio-Grande hides are soaked in a bath to each liter of which one gram of a product is added which is obtainable by mixing with one another 103 parts by weight of methylbutanolamine, 100 parts by weight of water and 26 parts by weight of sodium bisulphite. The optimum effect is attained in this case after about 48 hours. If instead of the said product the same amount of methylbutanolamine is added without sodium bisulphite, the same soaking effect is attained after 72 hours only.

What we claim is:—

1. The process for soaking dry hides which comprises treating the hides in a bath comprising a reaction product of an alkylol amine with sulphurous acid.

2. The process for soaking dry hides, which comprises treating the hides in a bath comprising a reaction product of an alkylol amine with a salt of sulphurous acid.

3. The process for soaking dry hides, which comprises treating the hides in a bath comprising a reaction product of an amine containing one alkylol group with sulphurous acid.

4. The process for soaking dry hides, which comprises treating the hides in a bath comprising a reaction product of monoethanol amine with sulphurous acid.

5. Hides soaked in a bath comprising a reaction product of an alklol amine with sulphurous acid.

6. Soaking preparations comprising a reaction product of an alkylol amine with sulphurous acid.

7. Soaking baths comprising water and a reaction product of monoethanol amine with sulphurous acid.

RICHARD KLEIN.
HEINRICH ULRICH.
PAUL KOERDING.